United States Patent [19]

Clark

[11] Patent Number: 5,491,078
[45] Date of Patent: Feb. 13, 1996

[54] LEACH SOLUTION CONTAINING GLUCOSE, GALACTOSE, CATALASE, GLUCOSE OXIDASE, GALACTOSE OXIDASE, ASCORBIC ACID AND WATER SOLUBLE METAL CYANIDES AND HALIDES

[76] Inventor: John R. Clark, 7778 Lewis St., Arvada, Colo. 80005

[21] Appl. No.: 355,396

[22] Filed: Dec. 12, 1994

Related U.S. Application Data

[62] Division of Ser. No. 962,477, Oct. 16, 1992, Pat. No. 5,385,827, which is a division of Ser. No. 788,543, Nov. 6, 1991, abandoned, which is a continuation-in-part of Ser. No. 409,752, Sep. 20, 1989, abandoned.

[51] Int. Cl.$^6$ .............................. C12P 3/00; C12Q 1/64; C12N 9/04; B01D 11/00
[52] U.S. Cl. ............................... 435/168; 435/9; 435/14; 435/25; 435/190; 435/262; 435/262.5; 423/68
[58] Field of Search .............................. 435/168, 9, 14, 435/25, 190, 262, 262.5; 423/68

[56] References Cited

U.S. PATENT DOCUMENTS

| | | | |
|---|---|---|---|
| 3,826,723 | 7/1974 | Woods et al. | 204/110 |
| 3,853,470 | 12/1974 | Morin et al. | 435/14 |
| 3,857,771 | 12/1974 | Sternberg | 435/817 |
| 4,064,010 | 12/1977 | Harris et al. | 435/191 |
| 4,186,052 | 1/1980 | Roder, et al. | 435/28 |
| 4,194,067 | 3/1980 | Keyes | 435/190 |
| 4,202,941 | 5/1980 | Terada et al. | 435/190 |
| 4,255,519 | 3/1981 | Terada et al. | 435/190 |
| 4,268,631 | 5/1981 | Ellis et al. | 435/190 |
| 4,321,323 | 3/1982 | Maselli et al. | 435/105 |
| 4,321,324 | 3/1982 | Maselli et al. | 435/102 |
| 4,530,903 | 7/1985 | Leuchtenberger et al. | 435/130 |
| 4,563,422 | 1/1986 | Deneke et al. | 435/27 |
| 4,609,625 | 9/1986 | Keyes et al. | 435/176 |
| 4,693,981 | 9/1987 | Wiesehahn et al. | 435/238 |
| 4,727,027 | 2/1988 | Wiesehahn et al. | 435/173 |
| 4,816,235 | 3/1989 | Pesic | 423/32 |
| 4,872,909 | 10/1989 | Allen et al. | 75/101 |
| 4,993,874 | 2/1991 | Klusman | 405/128 |
| 5,015,586 | 5/1991 | Severn | 436/29 |

OTHER PUBLICATIONS

Chao, T. T., Use of Partial Dissolution Techniques in Geochemical Exploration 1984, vol. 20, pp. 101–135, Journal of Geochemical Exploration.

Clark, J. R., Meier, A. L., and Riddle, G., Enzyme Leaching of Surficial Geochemical Samples for Detecting Hydromorphic Trace–Element Anomalies Associated with Precious–Metal Mineralized Bedrock Buried Beneath Glacial Overburden in Northern Minnesota, *Gold, '90*, Society of Mining Engineers, Chapter 19, pp. 189–207.

Karavaiko, G. I., Yurchenko, V. A., Remizov, V. I., Klyushnikova, T. M., 1986 Release of Hydrogen Peroxide by the Acinetobacter Calcoaceticus Culture for Manganese Leaching From Oxides, Mikrobiol. Zh. 1986, vol. 48, No. 5, pp. 41–45. Chemical Abstracts, 1987, vol. 106, 53737j.

O'Leary, R. M., and Viets, J. G., 1986, Determination of Antimony, Arsenic, Bismuth, Cadmium, Copper, Lead, Molybdenum, Silver, and Zinc in Geologic Materials by Atomic Absorption Spectrometry Using a Hydrochloric Acid–Hydrogen Peroxide Digestion. Atomic Spectroscopy, vol. 7, No. 1, pp. 4–8.

Taylor, R. M., and McKenzie, R. M., 1966, The Association of Trace Elements with Manganese Minerals in Australian Soils, Australian Journal of Soil Research, vol. 4, pp. 29–39.

Tyrygina, G. I., and Proskurina, R. D., 1978, Capacity of the Manganese–Leaching Strain Achromobacter Delicatulus Species 182 to Produce Hydrogen Peroxide. Prikl. Biokhim. Mikrobiol., vol. 14, No. 4, pp. 643–646. Chemical Abstracts, 1978, vol. 89, 176079j.

Tyrygina, G. I., Yakimenko, V. V., Babenko, Y. S., 1989, Regularity of Hydrogen Peroxide Production by Achromobacter Delicatulus 182–A Strain and its Participation in Manganese Leaching from Ores. Mikrobiol. Zh. (Kiev), 1989, vol. 51, No. 4, pp. 21–27, Chemical Abstracts, 1989, vol. 111, 150363v.

Worthington Catalog, "Enzymes and Related Biochemicals," pp. 83 and 84, 1982.

Grant & Hackh's Chemical Dictionary, p. 166, 5th Ed., 1987.

*Primary Examiner*—David M. Naff
*Assistant Examiner*—Michael V. Meller

[57] ABSTRACT

A leach solution comprises water, glucose and glucose oxidase. The oxidase acts upon the glucose to produce gluconic acid and hydrogen peroxide. The leach solution reacts with mineral elements and compounds to produce a leach reaction solution from which metal values can be obtained. The leach solution can also contain ascorbic acid, catalase, galactose, galactose oxidase and a salt such as water soluble metal cyanides and water soluble metal halides.

7 Claims, 7 Drawing Sheets

LEACH SOLUTION CONTAINING GLUCOSE, GALACTOSE, CATALASE, GLUCOSE OXIDASE, GALACTOSE OXIDASE, ASCORBIC ACID AND WATER SOLUBLE METAL CYANIDES AND HALIDES

CROSS REFERENCE TO RELATED APPLICATION

This application is a division of application Ser. No. 07/962,477, filed Oct. 16, 1992, now U.S. Pat. No. 5,385,827, issued Jan. 31, 1995, which application is a division of application Ser. No. 07/788,543, filed Nov. 6, 1991, now abandoned, which application is a continuation-in-part of co-pending application Ser. No. 07/409,752, filed Sep. 20, 1989, now abandoned.

BACKGROUND OF THE INVENTION

1. Field of the Invention

This invention relates to leach solutions for leaching manganese oxide containing materials to recover metal values contained therein.

2. Description of the Prior Art

By using a geochemical prospecting process, it is possible to infer the presence, location and magnitude of ore bodies below the surface. This process involves detecting surface areas containing excess localized anomalous concentrations of ore metals in comparison with their normal concentrations in the region. Such excess may result from diffusion or capillary transport of metal ions upward through overburden, or from physical transport of ore minerals, or from other hydromorphic processes which transport ground water and resulting stream flows. A detailed description of such prospecting may be found in "Geochemistry in Mineral Exploration" (2nd Ed.) by Rose, Hawkes and Webb, Academic Press, New York, 1979.

In an illustrative hydromorphic process, manganese and iron ions, together with associated ore metal compounds, are transported by water from below ground to the surface, where they precipitate as oxides. The fresh, initially largely amorphous, oxides deposit as coatings upon available solid bodies, ranging from clay particles to rocks and boulders. These oxides in turn scavenge heavy metal ions and metal compounds dissolved in the water. Depending upon the deposit conditions, metals such as silver (Ag), cobalt (Co) and copper (Cu) will associate predominantly with manganese oxides. Lead (Pb) will associate with iron oxide, while zinc (Zn) and nickel (Ni) will associate with either. Several forms of manganese dioxide occur in geological materials. Most of the manganese dioxide ($MnO_2$) in typical soils or sediments is present in crystalline phases. Amorphous and semi-amorphous (partially crystalline) manganese dioxide usually are a portion of the $MnO_2$ in surficial geological materials. The amorphous form of this compound is the most reactive form, and it is a very effective trap for many trace elements due to its complex surface and larger surface area.

Because the concentration of ore metals is higher in the oxide coatings than in the underlying solid bodies, it is advantageous to strip these coatings off the substrate before testing them for their metal content. This step enhances the contrast between the composition of anomalous samples and that of the normal background in the region, and permits a more sensitive and extensive delineation of the anomalous area. It is further advantageous to be able to strip separately the manganese oxide and iron oxide metal-containing materials.

For this purpose, numerous selective leach solutions have been developed which, when applied separately or in carefully-ordered sequences in well-known partial dissolution techniques, can strip off one or more of the separate components of the coating and resolve the sample into useful fractions. Most processes dissolve all of the manganese oxide. See, T. T. Chao, "Use of Partial Dissolution Techniques in Geochemical Exploration," Journal of Geochemical Exploration, Vol. 20 (1984) pp. 101–135, Elsevier Science Publishers, Amsterdam, and the bibliography attached thereto. Among these known leach solutions are hydroxylamine hydrochloride, oxalic acid and ascorbic acid. Hydroxylamine hydrochloride contains chloride ions, which can produce serious analytical interferences, and is not a viable leaching agent when seeking many low-level trace-element signatures. Ascorbic acid and oxalic acid leaches, on the other hand, are not selective for certain oxides.

Oxalic acid leaching of rock, soil, and stream sediment samples as an anomaly-accentuation technique is described by H. V. Alminas and E. M. Mosier in U.S. Geological Survey Open File Report 76–275, 25 pp, 1976. A rapid partial leach and organic separation for the sensitive determination of Ag, Bi, Cd, Cu, Mo, Pb, Sb, and Zn in surface geologic materials by flame atomic absorption is described by J. G. Viets, J. R. Clark and W. L. Campbell in Journal of Geochemical Exploration, Vol. 20, p. 355–366, 1984.

While concentrated hydrogen peroxide has been widely used as an oxidant in selective leaching processes, particularly for the destruction of organic portions of the sample, hydrogen peroxide can also function as a reducing agent for several metallic oxides. In an aqueous solution, it will react with manganese dioxide, consuming hydrogen ions, resulting in the manganese being reduced to the divalent state, which is soluble, thus:

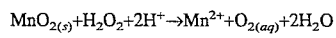

$$MnO_{2(s)} + H_2O_2 + 2H^+ \rightarrow Mn^{2+} + O_{2(aq)} + 2H_2O$$

In the process, all trace elements trapped in the manganese dioxide are released. See, for example, U.S. Pat. No. 4,872,909, issued Oct. 10, 1989 to J. P. Allen, et al. for "Process for Acid Leaching of Manganese Oxide Ores Aided by Hydrogen Peroxide." It is known, however, that concentrated $H_2O_2$ will only slowly dissolve some crystalline forms of manganese oxide.

Dilute hydrogen peroxide is a poor oxidizer of metallic gold and sulfide minerals. It is known, however, that $H_2O_2$ will act in combination with other reagents to aid in the leaching of these substances. The presence of $H_2O_2$ raises the fugacity of oxygen in a solution and helps increase the efficiency of dissolution of gold by cyanide. Hydrogen peroxide will oxidize halide ions, such as chloride, bromide, and iodide, to chlorine, bromine, and iodine. Aqueous solutions of these halogen elements can effectively oxidize and dissolve precious metals such as gold and many sulfide minerals.

It is well known in the art of beekeeping, that natural raw honey contains a very low concentration of the heat-labile enzyme, glucose oxidase, which, acting upon the dextrose in the honey, has the interesting property of maintaining a very low, 33 parts per million, concentration of hydrogen peroxide in the honey. This peroxide, among other factors, prevents growth of pathogenic and degradative microorganisms in the honey. In brief the reaction is:

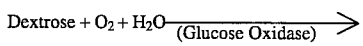

$$\text{Dextrose} + O_2 + H_2O \xrightarrow{\text{(Glucose Oxidase)}} \text{Gluconic Acid} + H_2O_2$$

OBJECTS OF THE INVENTION

It is the principal object of the present invention to provide an improved method of geochemical prospecting.

Another object of the present invention is to provide an improved leaching solution capable of leaching trace elements and minerals from soils, sediments, and rocks without leaching the underlying strata. A related object is to provide an improved leaching method utilizing the leaching solution, which method can be utilized for geochemical prospecting, pollution studies, agricultural studies and the like.

Another object of the present invention is to provide an improved method of geochemical prospecting which utilizes a selective leach capable of enhanced selection and separation of manganese oxides and iron oxides from the substrate on which they are present.

A further object of the present invention is to provide an improved method of geochemical prospecting utilizing a selective leach which not only is able to select and separate manganese oxide and iron oxide components, but also does not add materials which interfere with or confound the operation of analytical equipment used to analyze low concentrations of metals in the leachate.

A related object of the present invention is to provide an improved selective leaching solution for use in the separation and analysis of manganese oxides and iron oxides and components carried thereby.

Still a further object of the present invention is to provide an improved leaching solution capable of enhanced separation of amorphous and semi-amorphous manganese oxides.

Still another object of the present invention is to provide an improved selective leaching solution capable of separating manganese oxides and components carried thereby from iron oxides and components carried thereby.

Another related object of the present invention is to provide an improved method of selectively leaching geological materials to dissolve and separate manganese oxides therefrom.

A further object of the present invention is to provide an improved method of selectively leaching geological materials wherein manganese oxides and components carried thereby are separated from iron oxides and components carried thereby.

SUMMARY OF THE INVENTION

The present invention is embodied in an improved method of leaching soils, sediments, and rocks to remove surface minerals therefrom. The leaching solution is then analyzed and the results utilized for geochemical prospecting functions, pollution studies, agricultural studies and the like. The process utilizes a leaching solution containing highly dilute concentrations of hydrogen peroxide, either added to or generated within the solution. The preferred procedure is to generate the hydrogen peroxide within the solution utilizing a sugar and sugar enzyme reaction. More specifically, the dilute concentrations of hydrogen peroxide are formed by a leach solution comprising water, glucose, and glucose oxidase which acts upon the glucose to produce gluconic acid and hydrogen peroxide. Soil samples, sediment samples, rock samples and the like are then subjected to the leach solution, the leachate is separated from the solid materials and analyzed. The analytical results are utilized for a variety of purposes as indicated. For geochemical prospecting, for example, selected soil, sediment, and rock samples are contacted with a leach solution comprising water, glucose and glucose oxidase. The oxidase acts upon the glucose to produce gluconic acid and hydrogen peroxide which in turn leaches reactive manganese oxide phases, such as amorphous and semi-amorphous manganese dioxide, from the samples. The leach reaction solution is then separated from the materials and analyzed to determine quantitatively the mineral content thereof. The analytical results are used to predict the presence of an underground body of minerals.

In certain situations, it is desirable to analyze for iron and this can be accomplished by adding the enzyme catalase to the leaching solution. The catalase reacts with the hydrogen peroxide to produce water and oxygen. The destruction of hydrogen peroxide and the consumption of oxygen to produce gluconic acid together sufficiently lower the fugacity of oxygen of the leach solution to additionally dissolve iron oxides. A similar result can be obtained utilizing ascorbic acid.

For precious metals such as gold and metal sulfides, cyanide and halide ions can be added to the leaching solution. After the leaching reaction, the leaching reaction solution can be analyzed for precious metals and metals originally present as metal sulfides.

DESCRIPTION OF THE PREFERRED EMBODIMENT

Figure 1:
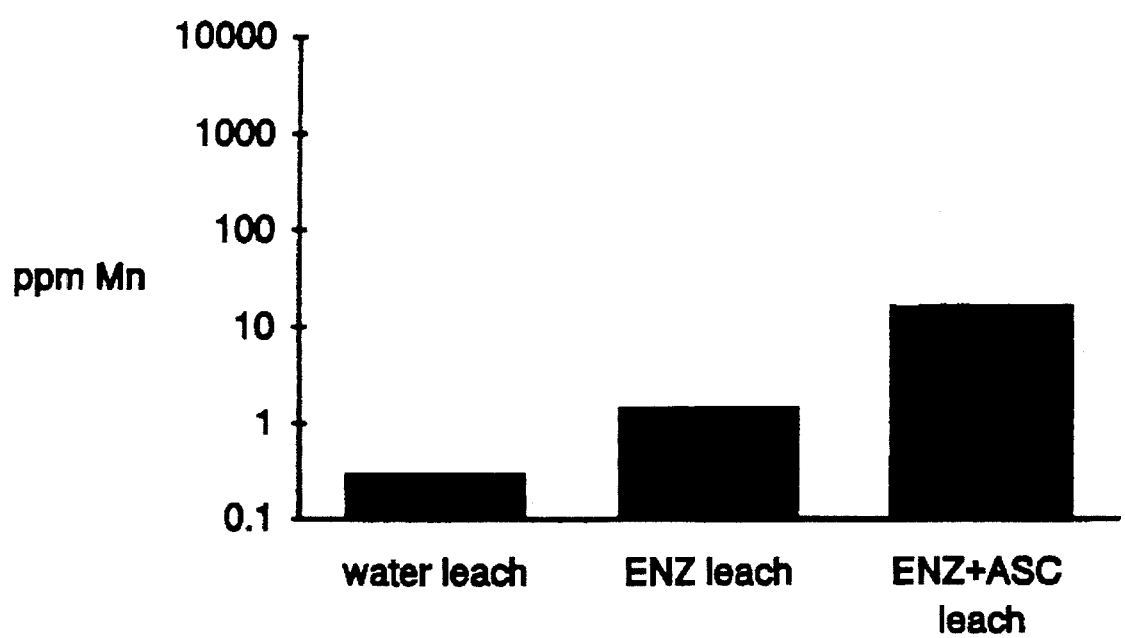
FIG. 1 is a bar graph showing the average manganese leached from northern Minnesota B-horizon soils with a water leach, the ENZ leach embodying the present invention, and the ENZ+ASC leach embodying the present invention.

The present invention is broadly embodied in a leaching solution and process capable of selectively leaching reactive materials from soils, sediments, rocks, and the like, and finds utility in a wide variety of applications including geochemical prospecting, heap leaching of precious metals, mineral exploration, pollution studies and agricultural studies.

The concept behind the present invention is the utilization of a leaching solution containing highly dilute amounts of hydrogen peroxide, either added to, or more preferably, generated directly within the leaching solution. One procedure for solution generation of hydrogen peroxide involves the use of sugars and sugar enzymes which react with the sugar to produce an organic acid or related compound such as an aldehyde, corresponding to the type of sugar and dilute concentrations of hydrogen peroxide. Also, there are enzymes that react with specific lipids, alcohols, cellulose or other organic substrates to produce hydrogen peroxide and corresponding byproduct compounds. The hydrogen peroxide range runs from 0.000001 molar to 1.0 molar hydrogen peroxide and more specifically 0.00001 molar to 0.1 molar peroxide, with a preferred range of 0.0001 molar to 0.01 molar peroxide. The solution can be further modified by utilizing cyanide ions, such as the alkaline metal cyanides, potassium cyanide and sodium cyanide as well as the halide ions, chloride, bromide, and iodide. These solutions find utility for leaching precious metals such gold and sulfide minerals. The broad range of cyanide and halide ions ranges from 0.000002 molar to 2.0 molar, more specifically from 0.00002 molar to 0.2 molar, with a preferred content of 0.002 molar cyanide or halide ion.

For some applications, a further enzyme can be added which acts upon the hydrogen peroxide to produce water and oxygen and thereby results in a leaching solution capable of leaching certain metal oxides such as iron oxides. Ascorbic acid when added in small amounts to the leaching solution, affords a similar function.

The present invention finds particular but not necessarily exclusive utility in geochemical prospecting applications, particularly for the location of various mineral deposits and trace metals carried thereby. The process is particularly selective to reactive amorphous and semi-amorphous manganese dioxide and trace elements trapped within those phases. This is accomplished by utilizing the leaching solution to leach geological materials with the intent of locating surface anomalies.

In the geochemical prospecting process embodying the present invention, soil, sediment, or rock samples are collected from a selected area. The sample collection sites are carefully mapped and the samples indexed. The samples are then analyzed by using an enzyme leach process capable of selectively leaching amorphous and semi-amorphous manganese dioxide and the trace elements trapped and retained thereby. The enzyme leach selectively dissolves relative large amounts of the specific reactive forms of manganese oxides desired to form a leachate. The leachate is then analyzed to reveal anomalies in the presence of trace minerals. The anomalies are then analyzed and studied, and an intelligent prediction is made as to the presence of underground mineral deposits.

The enzyme leaching solution utilized is a weak aqueous sugar solution, to which has been added a small amount of an enzyme capable of converting sugar to provide a low concentration of hydrogen peroxide and some organic acid. This solution is an effective selective leach solution capable of selectively dissolving relative large amounts of amorphous manganese oxides on the particles in a particular soil, sediment or rock sample, resulting in the release of the specific ore metal content, without appreciable attack on the iron oxides or the substrates of the particles.

A similar leach solution, to which has been added an enzyme capable of converting hydrogen peroxide to water and oxygen, or to which has been added some ascorbic acid, has a sufficiently lowered oxidation potential to dissolve iron oxides on the particles and release their ore metal content, without attacking the substrates of the particles. The hydrogen peroxide which is slowly generated in the enzyme-sugar leach solution, reacts with the reactive manganese dioxide which is present. The weak organic acid simultaneously produced is an excellent complexer of metals and helps to hold them in solution. It also contributes hydrogen ions to the reaction between hydrogen peroxide and manganese dioxide. Since the hydrogen peroxide is slowly generated, a negative-feedback effect results which limits its maximum concentration, and the hydrogen peroxide does not reach high concentrations at which it would effectively attack organic matter present in the sample. Nor would there be extensive oxidation and consequent possible dissolution of reduced mineral substances. The slow rate of reaction further allows the user to alter rates of sample leaching by adjusting concentrations of the reactants.

In the following description, reactant concentrations are given in weight/volume times 100 or volume/volume×100, e.g., 100×gm/ml, expressed as "percent." For example, 1% represents a concentration of 0.01 grams (or ml) of reactant per milliliter of solution. Further, amounts of enzyme reactants are expressed in terms of weight of the commercially prepared powders or volumes of commercially prepared aqueous suspensions in which they are obtained, which may typically contain a very small percentage of actual enzyme content.

It is very difficult to determine the weight of many enzymes in the commercial preparations in which they are sold. This is the case with glucose oxidase. Therefore, the concentration of many enzymes cannot be stated in terms such as mg/g or g/ml. There are standardized methods for measuring the activity of many enzymes, in which the rate of a reaction gives a measure of the activity of the enzyme in "units." Commercial preparations of enzymes are assayed by the manufacturer, and the customer can duplicate the assay procedure. Commercial enzyme preparations generally do not have a constant enzyme activity from lot to lot. The manufacturer lists the activity of the enzyme in each lot of product, and the customer can adjust the quantity of the product to be used.

The commercial preparation of glucose oxidase that has been used most often in enzyme leach is Sigma Chemical Company product number G-6125. The activity of glucose oxidase in that product ranges from 15,000 to 25,000 units per gram of solid. One unit of glucose oxidase will oxidize 1.0 micromole of beta-D-glucose to gluconic acid and $H_2O_2$ per minute at pH 5.1 at 35° C. The resulting amount of $H_2O_2$ produced in the leaching solution may range broadly from 0.000001 molar to 1.0 molar $H_2O_2$. Preferably, the amount of $H_2O_2$ should fall in the range 0.0001 molar to 0.01 molar.

The commercial preparation of catalase used in leaching has been Sigma Chemical product number C-3515, an aqueous suspension. It nominally contains 5,000 units catalase per milligram of protein, and it is sold as an aqueous suspension. Each individual lot assay lists the units of enzyme per milligram protein and the milligrams of protein per ml of suspension. One unit of catalase will decompose 1.0 micromole of $H_2O_2$ a per minute at pH 7.0 at 25° C., while the $H_2O_2$ concentration falls from 10.3 to 9.2 micromoles.

The lots of glucose oxidase that have been used in the present invention for the enzyme leach range from 18,000 to 23,800 units per gram of solid. Typically, 1.25 g of product G-6125 was dissolved in 25 ml water to make a stock enzyme solution containing 0.05 g/ml of G-6125 Then 0.1 ml of this solution was mixed with 15 ml of dilute glucose solution to leach a sample. This yielded 0.00033 g of G-6125/ml in the leach solution. With the possible range of glucose oxidase activity for that product, this yields a range of glucose oxidase activity for the leach solution of 5.0 to 8.3 units/ml of leach solution.

The selective leach solution must have a glucose concentration of at least 0.0001%, or 0.000001 g/ml, in order to be effective in leaching a sample at a solution-to-sample ratio of 50 to 1, and proportionately more for smaller ratios, and no more than 20%, or 0.2 g/ml, in order to avoid sticky solutions. The range 0.1% to 5.0%, or 0.001 g/ml to .05 g/ml is preferred, with the further note that, above about 5.0%, or 0.05 g/ml, carbon can deposit on the torch of an ICP/MS analytical instrument, if that instrument is used to analyze the leached metals. A 1%, or 0.01 g/ml, glucose concentration is preferred.

The glucose oxidase concentration should be at least 0.0001%, or 0.015 units/ml, in order to avoid too slow a reaction, and not more than 5.0%, or 1250 units/ml, in order to avoid excessive cost. The preferred range of glucose oxidase concentration is broadly 0.001% to 0.10%, or more narrowly, 0.15 units/ml to 25.0 units/ml. A 0.03%, or 7 units/ml glucose oxidase concentration is more specifically preferred.

For a reasonably rapid reaction to occur, the ratio of the amount of glucose oxidase to the amount of glucose should be at least 0.21 units/gm. To balance the amounts of glucose and glucose oxidase, the ratio of glucose oxidase to glucose should be in the range 0,001 to 1.0, or 21 units/gm to 21,000 units/gm. A ratio of 0.03, or 700 units/gm is preferred.

Commercial preparations of glucose oxidase frequently contain large amounts of another enzyme, catalase, which decomposes hydrogen peroxide into water and oxygen, lowering the oxidative potential of the solution. Too much catalase in the selective leach solution can lower that potential sufficiently that significant amounts of iron oxides can be reduced to the ferrous state and thus rendered soluble, along with the manganese oxides. This is undesirable when the intent is to analyze the two oxide suites separately. There are purified grades of glucose oxidase powder which contain only moderate amounts of catalase, of the order of one-tenth of their glucose oxidase content, and these can be used for leaches which are selective for manganese oxides alone.

But when the object is to dissolve the iron oxides, either in a second and separate treatment of the sample after the manganese oxide components have been stripped or in a combined single treatment to strip both the manganese and iron oxides, a selective leach comprising catalase, as well as glucose and glucose oxidase, can be effective. For this purpose, the concentration of catalase can be about equal to that of the glucose oxidase. The catalase concentrate should be at least 0.015 units/ml, in order to insure a sufficient rate of decomposition of hydrogen peroxides, and no more than 1500 units/ml, in order to avoid excessive cost. The preferred concentration of catalase in the solution is broadly in the range 0.0001% to 0.10%, or more narrowly 0.15 units/ml to 50 units/mi. A 0.0033%, or 6 units/ml, catalase concentration is preferred.

Catalase is obtained commercially from microbial and fungal sources and also from mammalian livers. Catalase from livers should be avoided, since it is frequently contaminated with a wide spectrum of heavy metals. Various other commercial enzyme preparations may contain other unwanted components, such as unacceptable amounts of sodium chloride, which can complicate the task of analyzing the resulting leachate.

The oxidative potential of a glucose-glucose oxidase selective leach solution can be lowered by adding a reducing organic acid such as ascorbic acid. The ascorbic acid concentration should be at least 0.0001 g/ml, in order to insure sufficient rates of decomposition of hydrogen peroxide, and no more than 0.05 g/ml, in order to prevent problems with instrumental determinations of elements in the leach solution. The preferred concentration of ascorbic acid in the solution is in the range 0.05% to 1%, or 0.0005 g/ml to 0.01 g/ml, and a 0.1% or 0.001 g/ml, concentration is preferred as it performs well and does not deposit excessive carbon in analytical instrumentation.

After a sample has been leached and the supernatant leachate drawn off, enough ultrapure nitric acid may be added to make the leachate 1% by volume $HNO_3$, to stabilize it against reprecipitation of some elements. Also, some formaldehyde should be added to prevent spoilage by microorganisms.

Many variations of the foregoing method can be devised. For one example, addition of a small amount of halide salt to the glucose-glucose oxidase leach solution produces an aqueous solution of the halogen, which attacks gold, platinum group metals and some sulfide minerals. Addition of glucose-glucose oxidase leach solution to a leach containing a pseudo-halide such as cyanide or thiocyanate, by raising the oxidation potential, increases the rate of leaching of gold, silver, and platinum group metals or sulfide minerals. Such variations in the leach have potential metallurgical applications for not only mineral exploration but also heap leaching ores and mine tailings to recover precious metal values.

The trace amounts of hydrogen peroxide produced by the glucose oxidase/glucose reaction will rapidly dissolve a relatively large amount (0.024 gram) of amorphous $MnO_2$ (Example X, below). Referring to FIG. 1, the typical manganese content of B-horizon soils in northern Minnesota ranges between 400 and 4,000 micrograms/gram (parts per million or ppm). Of a set of more than 1600 soil samples from that region the mean leachable Mn content with three leaches was as follows: water leach=0.3 ppm; Enzyme leach=1.5 ppm; Enzyme plus Ascorbic Acid leach=15 ppm (FIG. 1). Thus, the Enzyme leach, sometimes referred to as ENZ leach, typically dissolves less than 1% of the $MnO_2$ in these soil samples, and the Enzyme plus Ascorbic Acid leach, sometimes referred to as ENZ+ASC leach, removes less than 10%. This contrasts with the $MnO_2$-specific hydroxylamine hydrochloride leach which rapidly dissolves more than 60% of the total Mn in typical soil samples.

The present invention is highly selective for the most reactive form(s) of manganese dioxide, amorphous and semi-amorphous $MnO_2$. Because amorphous manganese dioxide is such an effective trap for many trace elements, the enzyme leach can be used to reveal anomaly contrast in samples that show no contrast with stronger partial leaches.

EXAMPLE I

Soil samples were collected on Little American Island, located about ten miles east of International Falls, Minn., in Rainy Lake. Little American Island is highly mineralized. All the material comprising the A-horizon of the soil (decaying leaf litter, humus, and organic-rich mineral layers) were excavated to reveal reddish-brown B-horizon. Approximately one pound of B-horizon material was collected at each site. The sample sites were marked as accurately as possible on the 1:24,000-scale Island View, Minn., 7½ minute quadrangle map that is published by the U.S. Geological Survey. Later, the latitude and longitude of the sample sites were determined from the field map using a digitizing pad attached to an IBM-compatible personal computer, running the GSMAP.EXE program published by the U.S. Geological Survey. For comparative purposes a set of B-horizon soil samples was collected from an unmineralized area south of International Falls, in the southern part of the Ranier, Minn., 7½ minute quadrangle. The sample locations are given in Table 1.

TABLE 1

Latitudes and Longitudes of sample sites near International Falls, MN, used in example of analytical results produced with Enzyme leach.

| Site Number | Latitude (°N) | Longitude (°W) |
|---|---|---|
| Little American Island set: | | |
| INL 0007 | 48.602194 | 93.167530 |
| INL 0008 | 48.602211 | 93.167365 |
| INL 0009 | 48.602224 | 93.167217 |
| Background set: | | |
| INL 0034 | 48.509631 | 93.344618 |
| INL 0035 | 48.508923 | 93.344665 |
| INL 0036 | 48.508264 | 93.344629 |

The samples were dried at 35° C. for approximately 48 hours and were sieved for the minus-0.25-mm (minus-60-mesh) fraction of the sample particles. The grain sizes in the sieved samples comprised the fine sand, very-fine sand, silt, and clay of these B-horizon soil samples. The preferred size fraction may vary with the sample media and location from which it was collected.

All the laboratory procedures described herein were conducted at ambient temperature and pressure. All reagent and standard solutions were prepared in water that had been purified to a minimum resistance of 16.7 megohms/cm using a Barnstead NANOpure II system. For most analyses, distilled water would be of sufficient purity. A 0.01 gram/ml (0.0555 molar) glucose solution was prepared by dissolving 30 grams of glucose (Sigma Chemical Co. product number G-5767) in water and diluting to three liters. An enzyme solution was prepared by dissolving 1.25 grams of glucose oxidase commercially available powder (Sigma Chemical Co. product number G-6125, prepared from *Aspergillus niger*) in 25 ml of water. The commercial powder containing the enzyme was weighed into a clean 25 ml volumetric flask, water was added, the contents were gently swirled until the enzyme was dissolved, and the solution was diluted to volume and mixed. The glucose oxidase activity in this stock solution ranges between 750 and 1,250 units per ml of solution. The assay of the particular lot of commercial enzyme powder used in this test was 23,800 units of glucose oxidase per gram of solid (Lot 46F-9655), yielding an activity in the stock solution of approximately 1,190 units/ml in the solution. As long as the glucose stock solution is not contaminated with microorganisms, it is stable for an indefinite period of time. A fresh glucose oxidase stock solution was prepared every 24 hours.

One gram of each sample was weighed into a separate 16 mm×150 mm disposable culture tube, 15.0 ml of the glucose stock solution was added, and 0.10 ml (119 units glucose oxidase) of the enzyme solution was added to each tube. The final enzyme concentration in the leach solution was about 7.9 units/ml. Immediately, each tube was capped with a new plastic cap (Fisher brand TainerTop, part number 02-706-33), shaken and vortexed to insure complete mixing of the contents. After 60 minutes each culture tube was vortexed again and centrifuged for 10 minutes at 2000 rpm. Ten (10.00) ml of the supernatant leach solution was carefully drawn off each leach tube (using an Eppendorf Maxipettor and Maxitip L) and transferred to new 16 mm×100 mm disposable culture tubes. Care was taken to prevent transfer of sediment and flotsam from the original culture tube. In order to prevent precipitation of trace metals in the leach solutions, 0.100 ml of concentrated nitric acid (Merck Suprapur brand) was added to each tube. In order to prevent the growth of microorganisms, 0.1 ml of concentrated formaldehyde (Fisher brand, analyzed reagent grade) also was added to each culture tube. At this point internal standard spikes of scandium and terbium were added for reasons outlined below. The additions of these liquids to the tubes was accomplished using a 100 microliter Eppendorf micropipet. Then the tube was sealed with a new cap (Fisher brand TainerTop), and the contents were thoroughly agitated to insure complete mixing.

The sample solutions can be analyzed by a variety of instrumental techniques, depending on which analytes are to be determined and the anticipated concentrations of those analytes in the leach solutions. Graphite furnace atomic absorption spectroscopy (GFAAS) or inductively coupled plasma/mass spectrometry (ICP/MS) would be appropriate instrumental methods for determining the low nanogram/ml (part-per-billion) concentrations of trace elements, such as cobalt, zinc, and arsenic, which would be expected in Enzyme leach solutions of typical soil samples. Inductively coupled plasma/atomic emission spectroscopy can be used to determine more geochemically abundant elements, such as magnesium, calcium, manganese and sodium. ICP/MS was used to determine cobalt, zinc, and arsenic in the soil samples described herein. Since it is advisable to use an internal standard for ICP/MS determinations, in order to correct for instrumental drift, spikes of one or more elements should be added to normalize the ion counts between the sample solutions and standard solutions.

A spike solution was prepared by adding 10 ml each of 1000 microgram/ml Sc and Tb, Spex Industries brand, standards to a 1 liter volumetric flask (Spex item numbers AQSC2-500 and AATB2-500, respectively, each of which was in a 2% (vol./vol.) nitric acid/water matrix). Ten ml of Merck Supraput brand nitric acid also was added to the volumetric flask, the contents were diluted to 1.000 liter and mixed. The resulting spike solution was 10 micrograms/ml each of scandium and terbium in an approximately 0.01 ml/1.0 ml nitric acid/water solution. Indium and lutecium were found to be equally effective as internal standards, and the stock solution would be prepared in a similar manner. At the time that the nitric acid and formaldehyde were added to each leach solution, 0.100 ml of this spike solution also was added to the leach solution.

ICP/MS standards for cobalt, zinc, and arsenic were also prepared from Spex brand 1000 microgram/ml standards (Spex item numbers AQCO2-500, AQZN1-500, and AAAS2-500, respectively). The commercial cobalt and arsenic standards were in 2% (vol./vol.) nitric acid/water solutions, while the zinc standard was in a 2% (vol./vol.) hydrochloric acid/water solution. A multielement stock standard was prepared by transferring 10.00 ml of each of these Spex standards to a 1 liter volumetric flask. Ten ml of Merck Suprapur brand nitric acid was added, and the contents were diluted to 1,000 liter. This yielded a stock standard containing 10 micrograms/ml of each cobalt, zinc, and arsenic in a 0.01 ml/1.0 ml nitric acid/water matrix.

A stock blank solution was prepared by dissolving 30 grams glucose (Sigma number G-5767) and 1.00 gram glucose oxidase (Sigma number G-6125) in water and diluting to 3.0 liters. The solution was transferred to a clean brown-glass bottle. Then 30 ml of Merck Suprapur nitric acid and 30 ml Fisher brand reagent formaldehyde were added an mixed with the contents of the bottle. Ten (10.00) ml of the Sc—Tb spike solution was diluted to 1.000 liter in a volumetric flask with this blank solution, the contents were mixed, and the solution was transferred to a new Nalgene plastic bottle. This yielded an instrumental analytical blank. Next, 2.00 ml of the 10 microgram/ml Co—Zn—As standard and 10.00 ml of the Sc—Tb spike solution were transferred to a 1.000 liter volumetric flask and diluted to volume with the stock blank solution. The solution was mixed and transferred to a new Nalgene plastic bottle and was used as a 20 nanograms/ml combined Co—Zn—As instrumental standard. Next, 10.00 ml of the 10 microgram/ml Co—Zn—As standard and 10.00 ml of the Sc—Tb spike solution were transferred to a 1.000 liter volumetric flask and diluted to volume with the stock blank solution. The solution was mixed and transferred to a new Nalgene plastic bottle and was used as a 100 nanograms/ml combined Co—Zn—As instrumental standard.

A Sciex Elan model 250 instrument was used to make the ICP/MS determinations. This instrument uses an inductively-coupled argon plasma torch as an ion source for a quadrupole mass spectrometer. Solutions containing the analytes are introduced into the plasma by means of a spray chamber, from where a flow of argon carries microscopic droplets of the solutions through an injector tube into the plasma. Instrumental settings were optimized using a 100 nanogram/ml cobalt standard. Readings for cobalt, zinc, and arsenic were collected at mass numbers 59, 66, and 75 respectively. A potential isobaric interference from titanium oxide was not a significant problem at mass 66, since the Enzyme leach does not effectively dissolve titanium. Simultaneously, readings were collected for Sc and Tb at mass numbers 45 and 159. All readings were measured in ion-counts per second, and the counts for cobalt, zinc, and arsenic were normalized against those for Sc and Tb. The instrumental blank and standard solutions were used to calibrate the ICP/MS instrument, and the sample solutions were compared to the standards in order to determine the amount of each element in the leach solutions. Since the dilution factor for the sample weight to leach-solution volume was 15, the analyses for the leach solutions were multiplied by 15 to provide the leachable concentrations of these elements in the soil samples.

Enzyme leachable cobalt, zinc and arsenic are substantially higher in the Little American Island soil samples than in the background samples (Table 2). This geochemical anomaly indicates the presence of mineralized bedrock on the island.

TABLE 2

Comparative Enzyme leach data from B-horizon soil samples collected near International Falls, Minnesota. Values are in nanograms/gram (parts-per-billion) of soil material.

| Sample No. | Co | Zn | As |
| --- | --- | --- | --- |
| Little American Island Set (mineralized area): | | | |
| INL 0007 | 79 | 560 | 51 |
| INL 0008 | 150 | 2000 | 1600 |
| INL 0009 | 41 | 240 | 71 |
| Background set: | | | |
| INL 0034 | 30 | 110 | 9 |
| INL 0035 | 38 | 160 | 14 |
| INL 0036 | 9 | 150 | 14 |

EXAMPLE II

Enzymes other than glucose oxidase will react with organic substrates to produce hydrogen peroxide. Some of these enzymes are available commercially, although they are quite expensive relative to glucose oxidase. One of these is galactose oxidase, which reacts with galactose and oxygen to produce galacto-hexodialdose and hydrogen peroxide. Leaching with this enzyme was performed in the same manner as described above. A galactose stock solution was prepared that contains 0.01 grams/ml (0.0555 molar) galactose instead of glucose in water. The galactose oxidase solution was prepared by dissolving 5.3 milligrams of Sigma Chemical product G-3385 in 0.80 ml water. This product is prepared from Dactylium dendroides (Sigma Chemical Co. catalogue). Lot number 50H6813 of this product contained 86 units/milligram solid (one unit produces a change in absorption at 425 nanometers of 1.0/min. at pH=6 and 25° C. with a 1 cm light path in a peroxidase and o-tolidine system). One gram of geological sample material was leached for one hour with 15 ml of the galactose solution and 0.2 ml (114 units enzyme) of the galactose oxidase solution. In all other respects this leach was conducted identically as described above. The galactose oxidase version of the enzyme leach is sometimes referred to herein as the GAOX leach.

EXAMPLE III

A stronger version of the enzyme leach uses the enzyme catalase in addition to glucose oxidase. Catalase decomposes hydrogen peroxide. The only commercial preparation that was found to be acceptable for this process was Sigma Chemical Co. product C-3515, which is a suspension prepared from *Aspergillus niger*. The steps in performing this version of the leach were the same as for the ENZ leach, except for the following changes. A catalase solution was prepared by diluting 0.075 ml of catalase product solution (Lot 116F-3828) in 15 ml water. The lot of catalase that was used contained 248,000 units of enzyme per ml. The resulting solution contained about 1240 units catalase per ml. One gram of each sample material was leached with a mixture of 15 ml glucose solution, 0.100 ml of the glucose oxidase solution, and 0.100 ml (124 units) of the catalase solution. The catalase concentration in the final leach solution was about 8.3 units/ml. The leach with catalase was allowed to proceed for 24 hours. In all other respects the procedure was the same as with the enzyme leach process described above. This version of the enzyme leach process is sometimes referred to herein as the ENZ+CAT leach.

EXAMPLE IV

Still another version of the enzyme leach uses ascorbic acid in place of catalase to achieve a more vigorous leach of the sample. In this procedure the ascorbic acid was included in the stock glucose solution, making a 0.01 gram/ml glucose and 0.001 gram/ml ascorbic acid solution. This was done by dissolving 30 grams glucose (Sigma Chemical product number G-5767) and 3 grams ascorbic acid (Baker brand product number 7-B581) in water and diluting to 3 liters. As with the catalase version of the leach, the leaching process was allowed to proceed for 24 hours. Three grams ascorbic acid was also included in the three-liter stock blank solution that was prepared for making instrumental standards, and a separate set of standards was used. All other steps were the same as with the ENZ leach process described above. This version of the enzyme leach is referred to herein as the ENZ+ASC leach.

For the purpose of producing comparative analyses, test samples were also analyzed using a water leach, where the leaching action of the traces of $H_2O_2$ produced by the enzyme would not have an effect on the results. This leach was conducted in an identical manner to the leach described above, except 15 ml of water was used to leach the samples instead of the glucose solution, and no glucose oxidase was added. Standards for this leach were prepared in a similar manner, except water was used for the final dilution instead of the leach blank solution. Formaldehyde was not added to either standard or sample solutions.

In examples discussed below, data is included for vanadium, cobalt, nickel, copper, zinc, arsenic, selenium, molybdenum, silver, antimony, tungsten, rhenium, gold, thorium, uranium, chlorine, bromine, iodine and manganese. Instrumental vanadium, nickel, copper, selenium, molybdenum, silver, antimony, tungsten, rhenium, gold, thorium, and uranium were prepared from Spex Industries 1000 microgram/ml standards (product numbers AQV2-500, AQNI2-500, AQCU2-500, AQSE2-500, PLMO9, AQAG2-500, AQSB5-500, AAW9-500, AQRE9-500, AQAU3-500, AQTH4-500, and AQU2-500 respectively). The standards were prepared in the same manner as the Co—Zn—As standards described above, except the highest concentration silver, tungsten, rhenium and gold standard was 20 nanograms/ml. The 10 microgram/ml silver stock standard was in a separate solution to prevent silver chloride from precipitating. These elements were included in combined standards along with cobalt, zinc and arsenic. A 1000 microgram/ml of each chlorine, bromine, and iodine stock combined standard was prepared by dissolving 1.51 grams ammonium chloride, 1.23 grams ammonium bromide, and 1.14 grams ammonium iodide in water and diluting to 1.000 liter in a volumetric flask. A combined halogen instrumental standard was prepared by diluting 0.200 ml of this stock standard to 1.000 liter with the appropriate blank leach solution, producing a 0.200 microgram/ml Cl—Br—I instrumental standard. A Spex Industries custom plasma 5.000% Mn standard in 20% nitric acid was used to make 2 microgram/ml standards in the appropriate blank matrix for ICP/AES determinations of Mn.

Cobalt, zinc, and Arsenic determinations were performed as described above. Vanadium, nickel, copper, selenium, bromine, molybdenum, silver, antimony, iodine, tungsten, rhenium, gold, thorium, and rhenium were determined by ICP/MS at mass numbers 51, 58, 63, 78, 81, 98, 107, 121, 127, 184, 187, 197, 234, and 238 (respectively). Chlorine was estimated indirectly by ICP/MS as chlorine oxide at mass number 53. Manganese determinations were performed by ICP/AES at 257.6 nanometers using an ARL brand model 3580 fixed channel spectrometer. Generally, enzyme leach solutions are sufficiently dilute that interelement interferences are minimal with ICP/AES.

Most elements in the leach solutions described above are stable, and determinations can safely be made as much as a month following leaching. The halogens are an exception. Dilute $HNO_3$ and $H_2O_2$ will combine to rapidly oxidize chloride, bromide, and iodide ions to aqueous $Cl_2$, $Br_2$, and $I_2$. The elemental halogens will then diffuse into the atmosphere through the polyethylene caps on the culture tubes. This oxidation will occur much more slowly if nitric acid is not added to the leach solutions. If chlorine, bromine, or iodine are to be determined, the leach solutions should not be stabilized with nitric acid, and the instrumental determinations should be made within 24 hours after the completion of the leaching process.

EXAMPLE V

The U.S. Geological Survey exploration reference standard soils were developed for use in mineral exploration (U.S. Geological Survey, Open-File Report 78-163). These standard soils are known to be inhomogeneous from one bottle to another. The results shown here are included for comparing the relative results that can be produced by different versions of the Enzyme leach. These standard soils can be obtained from the U.S. Geological Survey, Branch of Geochemistry, M.S. 973, Denver Federal Center, Denver, Colo. 80225.

Standard GXR-2 is a soil sample from the Park City mining district, Summit County, Utah. Standard GXR-5 is a B-horizon soil sample collected in Somerset County, Me., in an area covered by thin glacial till, where the underlying bedrock was mineralized. Leachable cobalt and antimony concentrations in GXR-2 and cobalt and nickel in GXR-5 increased with increasing intensity of the leaching process (Table 3). The ENZ and GAOX leaches appear to be roughly equivalent. The ENZ+ASC leach produces the strongest leaching action, and the ENZ+CAT leach is intermediate in strength between the ENZ and ENZ+ASC leaches.

TABLE 3

Comparative leach results for U.S. Geological Survey exploration reference standards GXR-2 and GXR-5. The leachable concentrations of Co, Sb, and Ni are given in nanograms/gram (parts per billion).

| GXR-2: | Leach | Co | Sb |
|---|---|---|---|
| | water | 40 | 585 |
| | GAOX | 54 | 735 |
| | ENZ | 55 | 915 |
| | ENZ + CAT | 144 | 2400 |
| | ENZ + ASC | 420 | 3300 |

| GXR-5: | Leach | Co | Ni |
|---|---|---|---|
| | water | 150 | 630 |
| | GAOX | 195 | 780 |
| | ENZ | 180 | 705 |
| | ENZ + CAT | 510 | 1470 |
| | ENZ + ASC | 870 | 2250 |

EXAMPLE VI

Natural trace-element pollution and man-made pollution are dispersed by the same geochemical processes. The same processes also determine availability of trace elements in soils and sediments to plants and other organisms. Therefore, methods that are employed in geochemical mineral exploration are often used in studying anthropogenic pollution. Partial analysis also is often used by agricultural scientists to determine the availability of nutrient and toxic trace elements to plants.

Water from the Argo tunnel, which was constructed to drain the mines in Central City, Colo., empties into Clear Creek near the town of Idaho Springs, Colo. Much of the bedrock outcropping in the Clear Creek drainage is strongly mineralized, resulting in high metal concentrations in the stream sediments. Numerous old mine dumps upstream from Idaho Springs also contribute metals to the sediments in the drainage. The effluent from the Argo tunnel is highly enriched in metals. An active stream sediment sample was collected 200 yards downstream from the point where Argo tunnel waste entered Clear Creek. Partial leaching offers a means of determining what portion of metals in a soil or sediment may have been added recently and what portion has resided in the sample material for a longer period of time. For comparison purposes, a stream sediment collected in Turkey Creek, 1.0 mile upstream from U.S. Highway 285, Jefferson County, Colo., was also analyzed. The Turkey Creek drainage does not contain highly mineralized bedrock although similar types of bedrock outcrop in both drainages. Although there has been human activity in the Turkey Creek drainage for over a century, anthropogenic pollution is minor compared to the Clear Creek basin. These samples were air dried and sieved for the minus-0.25-mm particle-size fraction. Both samples were subjected to the water leach, the GAOX leach, the ENZ leach, the ENZ+CAT leach, and the ENZ+ASC leach. The results are given in Table 4.

TABLE 4

Leachable concentrations of Co, Zn, and Mo in stream sediment samples collected in Clear Creek, downstream form the Argo Tunnel4 and in Turkey Creek, using five partial leaches. The leachable concentrations of Co, Zn, and Mo are given in nanograms/gram (parts per billion).

| Leach/Sample | Co | Zn | Mo |
| --- | --- | --- | --- |
| water-Argo tunnel | 75 | 6,150 | 435 |
| water-Turkey Creek | 6 | 120 | 15 |
| GAOX-Argo tunnel | 91 | 8,600 | 570 |
| GAOX-Turkey Creek | 17 | 150 | 27 |
| ENZ-Argo tunnel | 165 | 12,450 | 645 |
| ENZ-Turkey Creek | 28 | 180 | 34 |
| ENZ + CAT-Argo tunnel | 960 | 210,000 | 735 |
| ENZ + CAT-Turkey Creek | 300 | 3,300 | 41 |
| ENZ + ASC-Argo tunnel | 2,850 | 150,000 | 3,600 |
| ENZ + ASC-Turkey Creek | 750 | 4,200 | 61 |

Referring to Table 4, with regard to only these two samples, the order of leaches shown in Table 4 is the order of progressively stronger leaching. In this case, the GAOX leach produces slightly weaker leaching action than the ENZ leach. There is substantial contrast between the Argo tunnel and the Turkey Creek samples with all of the partial leaching methods used. Thus, any of these weak partial leaching procedures is viable for use in mineral exploration in that region. Relatively large quantities of metals in the Argo tunnel sample are water soluble, loosely bound, or trapped by amorphous or semi-amorphous $MnO_2$. Any metals contributed in solution to Clear Creek by Argo tunnel effluent will most likely be present in such forms. Much larger portions of these metals are held more deeply in oxide coatings on sediment grains and are probably derived from sources upstream from the Argo tunnel. Therefore, these partial leaches can be used to determine possible sources for both anthropogenic and natural pollution.

EXAMPLE VII

Figure 2A:
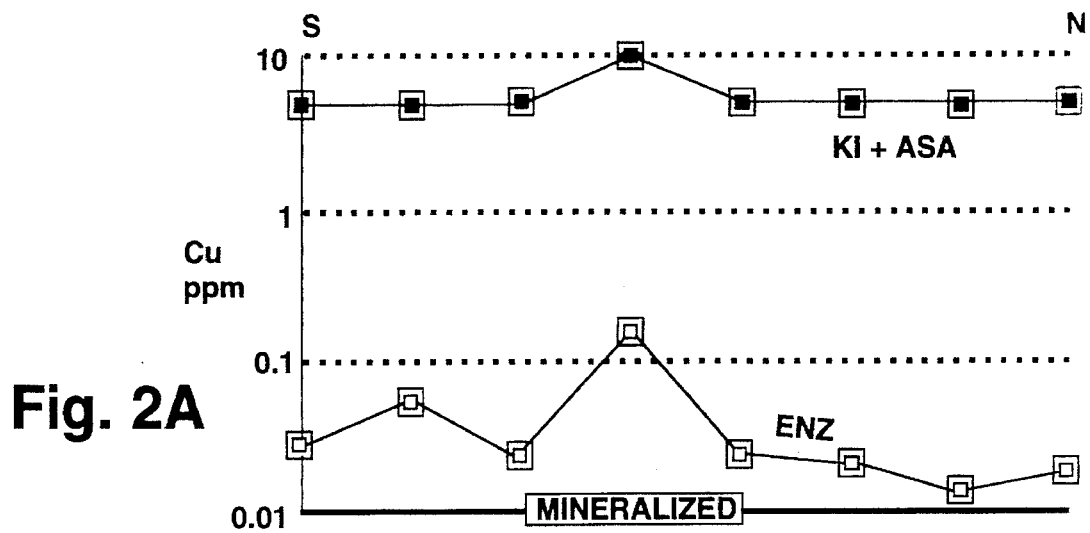
FIG. 2A constitutes of a graph of analytical data for Cu in B-horizon soil samples taken along a traverse over mineralized bedrock, south of Indus, Minn.
Figure 2B:
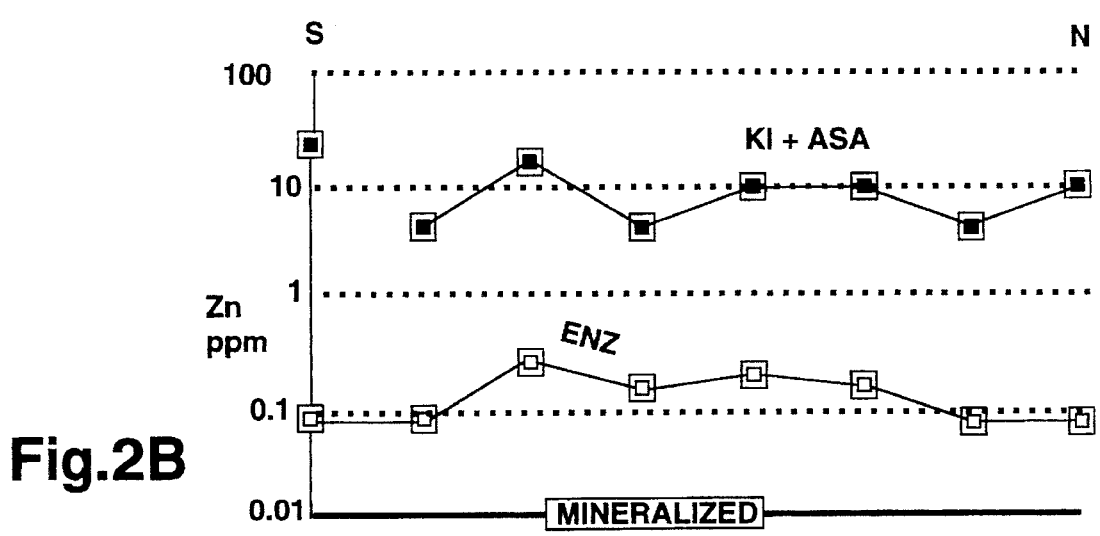
FIG. 2B constitutes of a graph of analytical data for Zn in B-horizon soil samples taken along a traverse over mineralized bedrock, south of Indus, Minn.
Figure 2C:
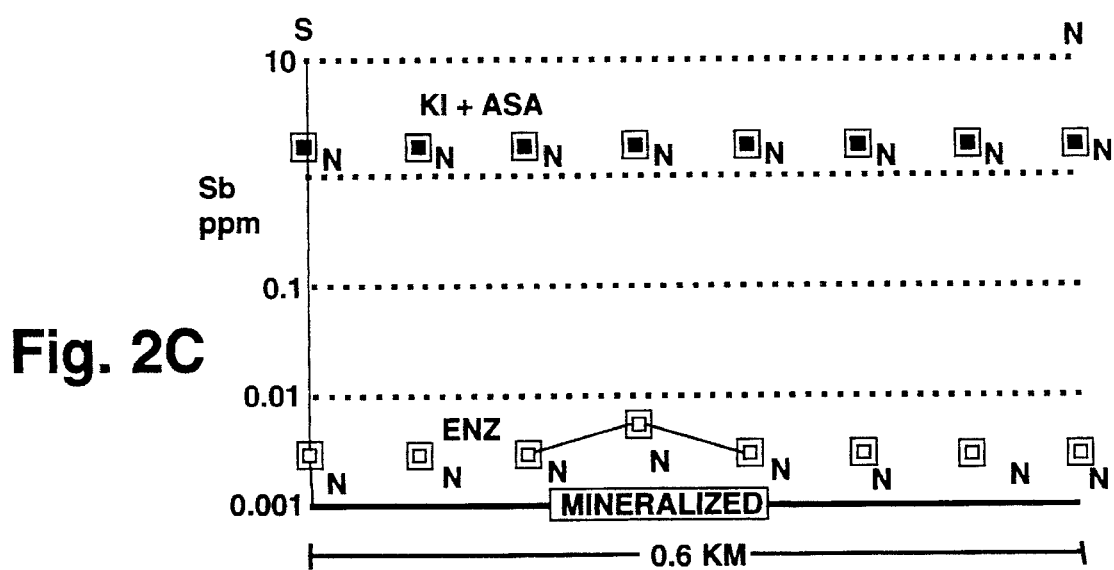
FIG. 2C constitutes of a graph of analytical data for Sb in B-horizon soil samples taken along a traverse over mineralized bedrock, south of Indus, Minn.

A very low-grade mineral prospect occurs about 2.5 miles south of Indus, Minn., in an area where the bedrock is typically covered by 5 to 30 feet of till and glacial-lake sediment. B-horizon soil samples were collected along a traverse across the mineralized area (sample sites listed in Table 5). The samples were dried and sieved as described above. These samples were analyzed using the ENZ leach and a much stronger potassium iodide+ascorbic acid leach (Viets and others, 1984). Copper gives four-times better anomaly/background contrast with the ENZ leach than with the KI+ascorbic acid leach (FIG. 2A). Zinc produces no discernable contrast with the conventional partial leach, while an anomaly contrast of two-times background was found with the ENZ leach (FIG. 2B). No antimony (Sb) anomaly could be detected with the conventional leach, but a small antimony (Sb) anomaly was found with the ENZ leach (FIG. 2C). In this situation the highly selective nature of the enzyme leach makes it much better suited to detecting subtle geochemical anomalies than the conventional KI+ascorbic acid leach.

TABLE 5

Latitudes and Longitudes of soil sample sites over mineral prospect south of Indus, MN.

| Site Number | Latitude (°N) | Longitude (°W) |
| --- | --- | --- |
| INL 0039 | 48.592165 | 93.862022 |
| INL 0040 | 48.592769 | 93.862063 |
| INL 0041 | 48.593291 | 93.862060 |
| INL 0043 | 48.593680 | 93.862128 |
| INL 0044 | 48.593939 | 93.862069 |
| INL 0045 | 48.594445 | 93.862057 |
| INL 0046 | 48.595055 | 93.862057 |
| INL 0047 | 48.599014 | 93.861813 |

EXAMPLE VIII

Figure 3:
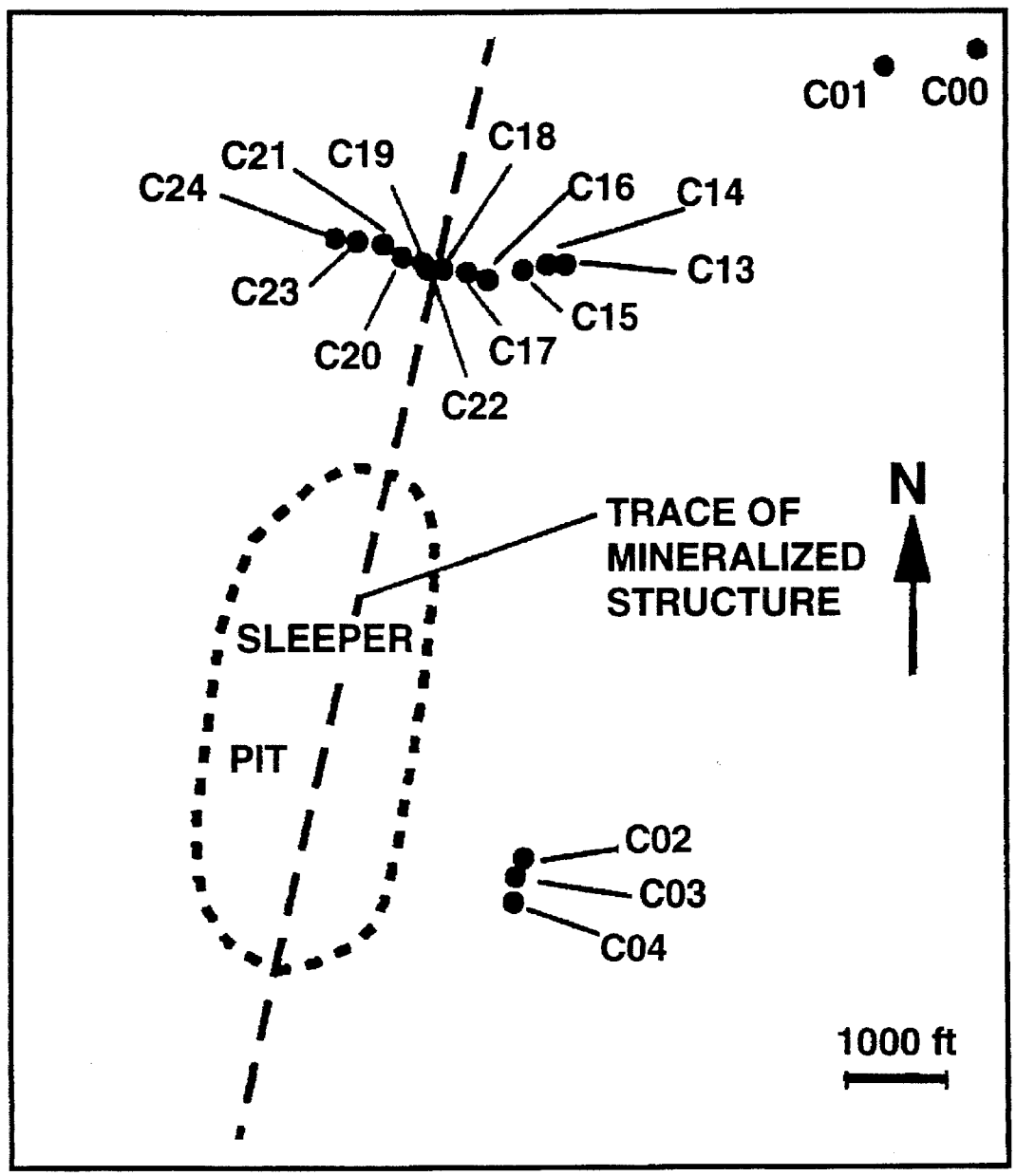
FIG. 3 is a locality map of background and traverse samples relative to the Sleeper mine pit and its mineralized structure.

The Sleeper gold mine, located along the west flank of the Slumbering Hills about 30 miles northwest of Winnemucca, Nev., was covered by basin fill unrelated to the mineralized bedrock of the deposit. Undisturbed soil samples were collected along a traverse across the mineralized structure north of the mine pit, and background soil samples were collected upslope from that structure (FIG. 3). The overburden thickness was about 50 feet at sample site c13, and it dropped off to about 150 feet thick at site c24. All samples were collected at a depth of 10 to 18 inches to avoid wind-blown contamination. The samples were air dried and sieved for the minus-0.25-mm fraction of the soil. For comparative purposes three partial leaches were used to analyze the sieved samples. The oxalic acid leach (Alminas and Mosier, 1976) and the KI+ascorbic acid leach (Viets and others, 1984) were used to show the results with conventional methods of partial analysis, and the ENZ leach was used to detect any subtle anomalies that might be present.

Figure 4:
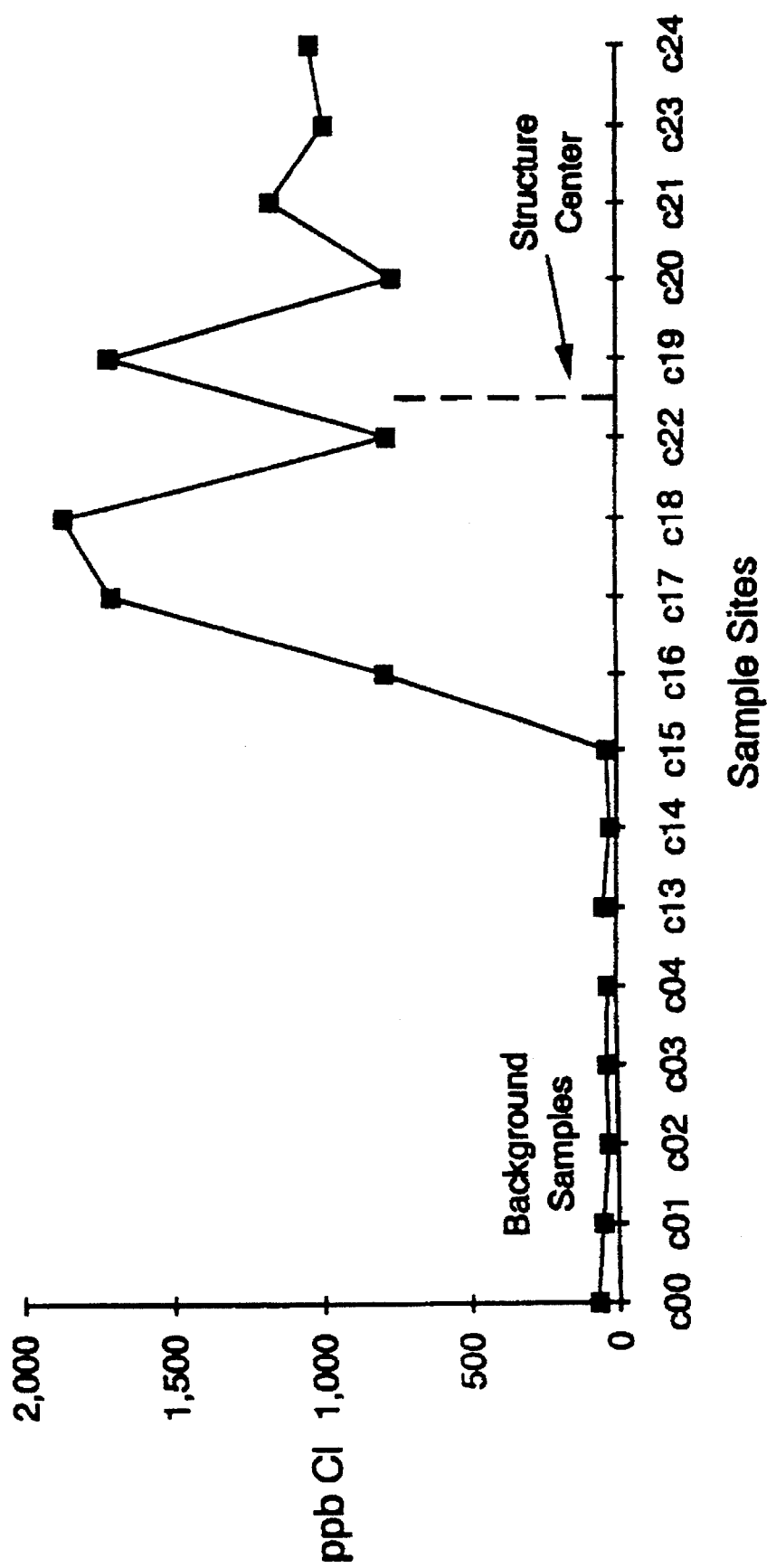
FIG. 4 is a graph illustrating an ENZ-leach chlorine anomaly in soils over the mineralized structure near the Sleeper mine locality shown in FIG. 3.
Figure 5:
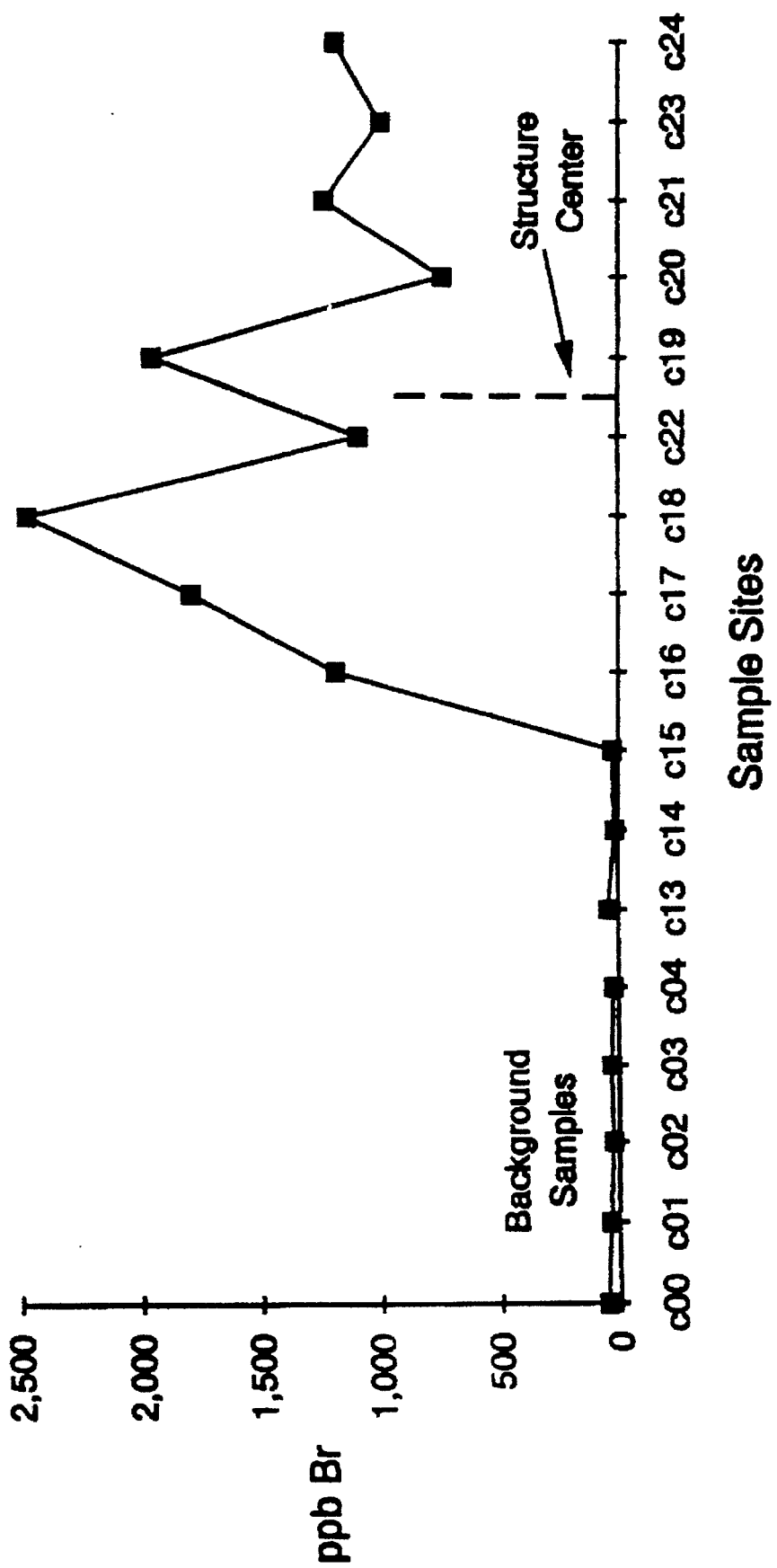
FIG. 5 is a graph illustrating an ENZ-leach bromine anomaly in soils over the mineralized structure near the Sleeper mine locality shown in FIG. 3.
Figure 6:
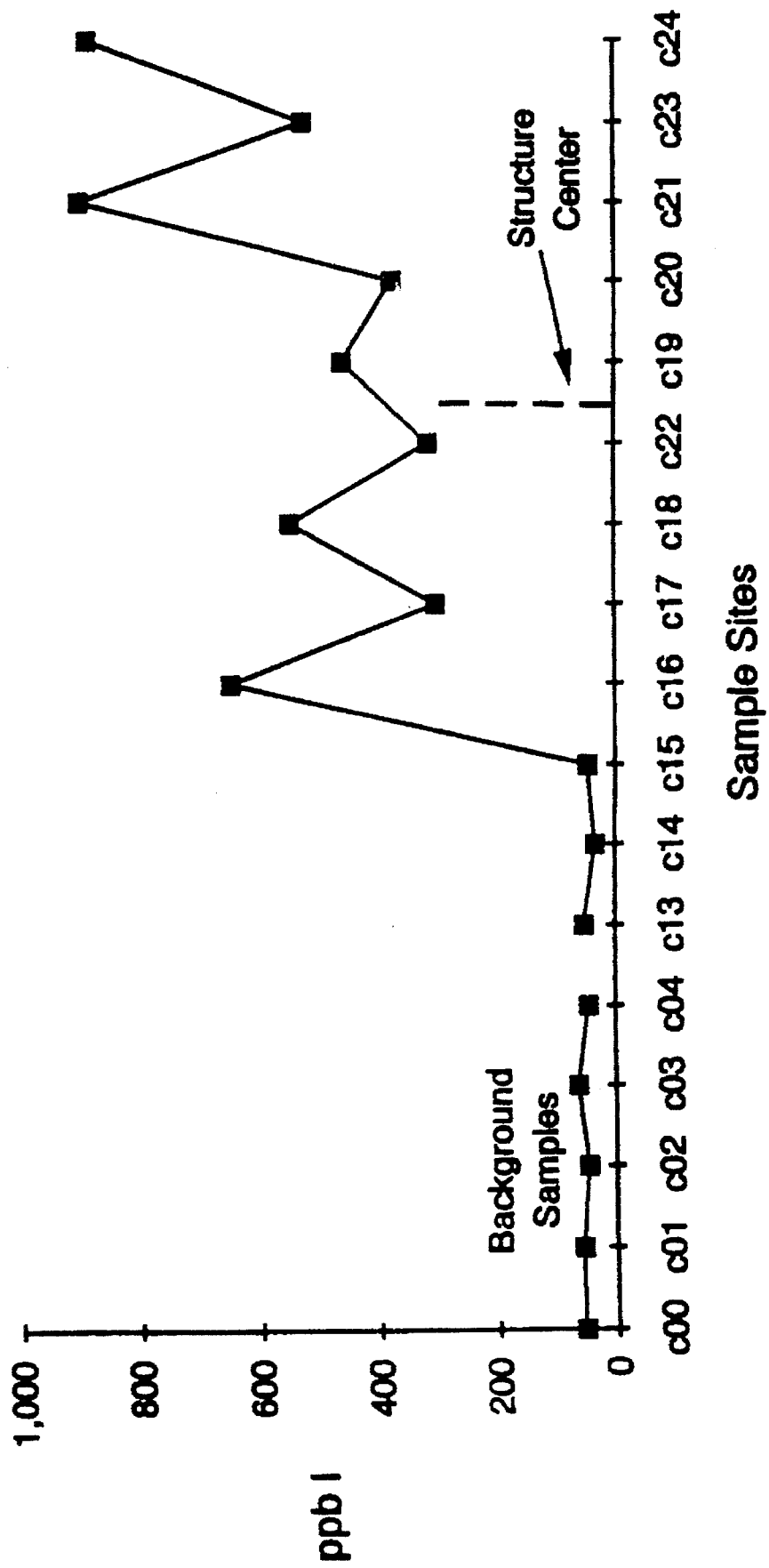
FIG. 6 is a graph illustrating an ENZ-leach iodine anomaly in soils over the mineralized structure near the Sleeper mine locality shown in FIG. 3.
Figure 7:
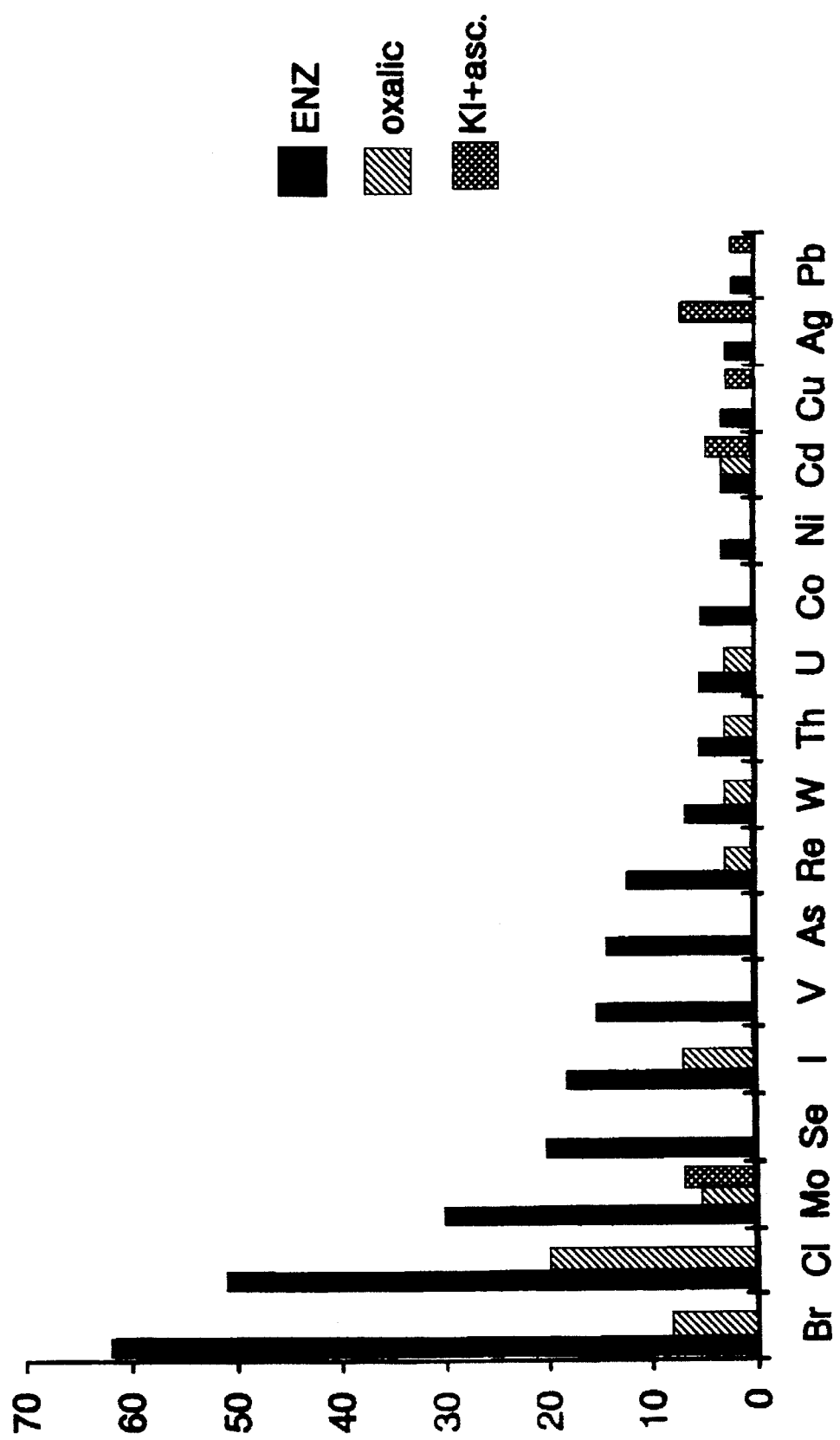
FIG. 7 is a chart showing anomaly/background ratios for the anomalous elements in soils near the Sleeper mine locality shown in FIG. 3, determined with the ENZ leach embodying the present invention, and prior art oxalic acid and KI+ascorbic acid leaches.

A large number of elements were found to be anomalous with the ENZ leach in an area near the mineralized structure. The ENZ-leach anomalies for chlorine, bromine, and iodine are shown in FIGS. 4, 5, and 6, respectively. More elements were found to be anomalous with the ENZ leach, and the anomaly to background ratio was substantially greater with the ENZ leach, compared to the oxalic acid and KI+ascorbic acid leaches (FIG. 7). Standards for elements in this figure were prepared as described above in a similar manner using the appropriate Spex standards. ICP/MS was used for ENZ leach and oxalic acid leach determinations, and ICP/AES was used for KI+ascorbic acid leach determinations. The Enzyme leach detected geochemical anomalies related to mineralized bedrock in this particular desert pediment situation better than either of the conventional methods of partial analysis tested. The KI+ascorbic acid leach did not detect Br, Cl, I, V, Re, W, Th, U, Co, or Ni.

It was discovered in this test that chlorine, bromine, and iodine are key pathfinder elements in certain overburden situations. The ENZ leach produces much greater contrast for these elements than was found with the oxalic acid leach. It may be that these halogen elements are present in the samples as halide salts, such as NaBr or $MnI_3$, or more easily oxidized bromine and iodine may be present as bromate or iodate salts, such as $KBrO_3$ or $NaIO_3$. These salts may be encapsulated by manganese oxide coatings or the various halogen ions may actually be trapped by amorphous $MnO_2$. In either case, the leaching action of dilute $H_2O_2$ can release these elements, while the halogen elements, regardless of oxidation states, in the mineral substrates beneath the oxide coatings are not leached.

EXAMPLE IX

In order to determine the effectiveness of the present process for use in the extraction of gold, silver, copper, and other sulfide minerals, tests were run in which small amounts of cyanide, iodide, bromide, or chloride were added to solutions that were otherwise set up like ENZ leaches. Stock solutions were prepared by separately dissolving each of the following salts in water and diluting to 250 ml in a volumetric flask; 3.68 grams NaCN, 10.87 grams $NH_4I$, 7.35 grams $NH_4Br$, and 4.01 grams $NH_4Cl$. This produced stock solutions that were 0.30 molar in the respective salt. U.S. Geological Survey exploration standard GXR-4 is a copper-mine millhead that contains moderate amounts of metal-rich sulfide minerals. USGS exploration standard GXR-6 is a composite B-horizon soil sample from a gold district in Davidson County, N.C. One (1.00) gram portions of each of these standards were weighed out for leaching with 96-hour adaptations of the ENZ leach: the ENZ leach alone, the ENZ+cyanide leach, the ENZ+iodide leach, the ENZ+bromide leach, and the ENZ+chloride leach. Fifteen ml of 0.01 g/ml glucose solution was added to each 1.00 gram portion of sample, 0.100 ml (119 units) glucose oxidase solution and 0.100 ml of appropriate cyanide or halide salt solution was added to each tube, and the tubes were capped and thoroughly mixed. The final concentration of each salt in its respective leach solutions was about 0.002 molar. Each tube was again thoroughly mixed at 24 hours, 48 hours, 72 hours, and 96 hours. At 24 and 48 hours the caps were removed and resealed to allow air into the tubes, prior to mixing. After the final mixing, the tubes were centrifuged for 10 minutes at 2000 rpm. From that point on the leaches were treated as ENZ leaches, and the solutions were analyzed for Cu, Ag, and Au (Table 6).

TABLE 6

Extractable Cu, Ag, and Au in GXR-4 and GXR-6 after leaching for 96 hours with the ENZ leach, the ENZ + cyanide leach, the ENZ + iodide leach, the ENZ + bromide leach, and the ENZ + chloride leach. The leachable concentrations are given in nanograms/gram (parts per billion).

| Standard | Leach | Cu | Ag | Au |
|---|---|---|---|---|
| GXR-4: | ENZ | 3000 | <5 | <3 |
|  | ENZ + CN | 37500 | <5 | 195 |
|  | ENZ + I | 11850 | 9 | <3 |
|  | ENZ + Br | 4500 | 40 | <3 |
|  | ENZ + Cl | 4800 | 5 | <3 |
| GXR-6: | ENZ | — | <5 | <3 |
|  | ENZ + CN | — | 28 | 60 |
|  | ENZ + I | — | 10 | 34 |
|  | ENZ + BR | — | 43 | 6 |
|  | ENZ + Cl | — | 10 | 4 |

Copper and silver in GXR-4 are primarily contained within the sulfide minerals, such as chalcopyrite, while gold possibly occurs as metallic inclusions within pyrite. Gold and silver in GXR-6 are probably present as native metals within the soil. These tests show that solutions containing sodium or potassium cyanide, iodide, bromide, or chloride salts in combination with glucose and glucose oxidase can be used for leaching metals from sulfide minerals (GXR-4) or for leaching of precious metals from oxidized geological materials (GXR-6). Where extended leaching times do not present a problem, such as heap-leaching operations, these adaptions of the enzyme leach have potential applications. Maintaining a low hydrogen peroxide concentration in a leach solution by replenishing the spent $H_2O_2$ by means of an enzyme reaction will have distinct metallurgical advantages in some heap leaching operations. These variations of the leaching process can also be used to detect precious metal and base metal anomalies in geological materials.

EXAMPLE X

A Mn solution was prepared by dissolving 21 grams of Baker analyzed reagent grade manganous carbonate in 100 ml deionized water and 10 ml sulfuric acid. Any $MnO_2$ in the mixture was dissolved by adding 2 ml concentrated (30%) $H_2O_2$ and mixing. Two hundred ml of Baker reagent grade phosphoric acid was added and the solution was diluted to one liter with distilled water, making a 0.005 grams/ml Mn solution. Two grams of pure quartz granules (1 mm to 2 mm in diameter) were weighed into a 16 mm×150 mm culture tube. These granules provided an inert surface upon which amorphous $MnO_2$ precipitate can form. Virtually any non-reactive surface can be provided for this purpose, from ceramic beads to stainless steel shot. Next, 0.5 grams of potassium bromate (Baker analyzed reagent grade) and 3 ml of the Mn solution were added. The mixture was heated for 1 hour to ensure that all the Mn was oxidized to $MnO_2$. The result was an artificial amorphous $MnO_2$ coating on the quartz granules and the wall of the culture tube. The aqueous solution was decanted, and the solid contents were rinsed with 10 ml distilled water ten times, decanting the rinse water after each rinse. After the last rinse, the contents of the tube were warmed on a hot plate until dry.

A solution containing 0.10 grams/ml glucose in distilled water was prepared. Three ml of this glucose solution was added to the culture tube containing the artificial $MnO_2$ coating. Next, 0.08 grams of glucose oxidase (Sigma Chemical Co. product number G-6125) was added, the tube was sealed with a plastic stopper, and the contents were gently shaken to dissolve the enzyme and to uniformly mix the contents. Every ten minutes, the tube was gently rotated and sloshed to continue mixing the reactants.

Within 15 minutes there was a visible difference in the thickness and evenness of the $MnO_2$ coating. After 30 minutes, some of the quartz granules were essentially free of $MnO_2$ coating. At 1 hour, almost all the $MnO_2$ coating was gone, and after 2 hours the entire $MnO_2$ coating had been leached from the contents of the tube. Analysis of the leach solution confirmed that >96% of the Mn added to the tube was recovered in the leach solution.

While certain illustrative embodiments of the present invention have been shown in the drawings and described in detail in the specification, it should be understood that there is no intention to limit the invention to the specific form and embodiments disclosed. On the contrary, the intention is to cover all modifications, alternative constructions, equivalents and uses falling within the spirit and scope of the invention as expressed in the appended claims.

I claim:

1. A leach solution for selectively leaching metal sulfide containing material for separating metals therefrom, said solution comprising water, glucose in the amount of from 0.000001 g/ml to 0.2 g/ml, glucose oxidase in the amount of from 0.015 units/ml to 1250 units/ml, and a salt selected from the group consisting of water soluble metal cyanides and water soluble metal halides, said salt providing a concentration of said cyanide or said halide in the amount of from 0.000002 molar to 2.0 molar.

2. A leach solution for selectively leaching materials for separating reactable metals and metal salts therefrom, said solution comprising water, glucose in the amount of from 0.000001 g/ml to 0.2 g/ml glucose oxidase in the amount of from 0.015 units/ml to 1250 units/ml, and ascorbic acid in the amount of from 0.000001 g/ml to 0.05 g/ml.

3. A leach solution as defined in claim 2 wherein said selective leach solution additionally comprises catalase in the amount of from 0.15 units/ml to 50 units/ml.

4. A leach solution for selectively leaching manganese oxide and iron oxide containing material for separating reactive manganese oxides therefrom, said solution comprising water, a sugar selected from the group consisting of glucose and galactose in the amount of from 0.000001 g/ml to 0.2 g/ml, a sugar enzyme selected from the group consisting of glucose oxidase and galactose oxidase in the amount of from 0.015 units/ml to 1250 units/ml and capable of acting on said sugar to produce a weak organic acid and hydrogen peroxide and ascorbic acid in the amount of from 0.000001 g/ml to 0.05 g/ml.

5. A leach solution as defined in claim 4 for additionally dissolving iron oxides wherein said selective leach solution additionally comprises catalase in the amount of from 0.15 units/ml to 50 units/ml.

6. A leach solution for selectively leaching metal sulfide containing material for separating metals therefrom, said solution comprising water, a sugar selected from the group consisting of glucose and galactose in the amount of from 0.000001 g/ml to 0.2 g/ml, a sugar enzyme selected from the group consisting of glucose oxidase and galactose oxidase in the amount of from 0.015 units/ml to 1250 units/ml which acts upon said glucose or said galactose to produce a weak organic acid and hydrogen peroxide, and a salt selected from the group consisting of water soluble metal cyanides and water soluble metal halides, said salt providing a concentration of said cyanide or said halide in the amount of from 0.000002 molar to 2.0 molar.

7. A method of selectively leaching a metal sulfide containing material for separation of a metal therefrom, comprising the steps of contacting said material with a leach solution comprising water, glucose in the amount of from 0.000001 g/ml to 0.2 g/ml, glucose oxidase in the amount of from 0.015 units/ml to 1250 units/ml which acts upon said glucose to produce gluconic acid and hydrogen peroxide, and a salt selected from the group consisting of water soluble metal cyanides and water soluble metal halides with a concentration of said cyanide or said halide in the amount of from 0.000002 molar to 2.0 molar, reacting said material with said leach solution to produce a metal containing leach reaction solution, separating said leach reaction solution from the residue of said material, and recovering said metal from said leach reaction solution.

* * * * *